United States Patent
Oishi et al.

(10) Patent No.: US 12,081,093 B2
(45) Date of Patent: Sep. 3, 2024

(54) AC ELECTRIC MOTOR DRIVE SYSTEM

(71) Applicants: Mitsubishi Electric Corporation, Tokyo (JP); Mitsubishi Electric Engineering Company Limited, Tokyo (JP)

(72) Inventors: Masayuki Oishi, Tokyo (JP); Kazuyoshi Watabu, Tokyo (JP); Yuki Fujita, Tokyo (JP); Hiroyuki Ichinose, Tokyo (JP)

(73) Assignees: MITSUBISHI ELECTRIC CORPORATION, Tokyo (JP); MITSUBISHI ELECTRIC ENGINEERING COMPANY, LIMITED, Tokyo (JP)

( * ) Notice: Subject to any disclaimer, the term of this patent is extended or adjusted under 35 U.S.C. 154(b) by 322 days.

(21) Appl. No.: 17/424,936

(22) PCT Filed: Mar. 24, 2020

(86) PCT No.: PCT/JP2020/013069
§ 371 (c)(1),
(2) Date: Jul. 22, 2021

(87) PCT Pub. No.: WO2020/217821
PCT Pub. Date: Oct. 29, 2020

(65) Prior Publication Data
US 2022/0094234 A1    Mar. 24, 2022

(30) Foreign Application Priority Data
Apr. 22, 2019  (JP) .................. 2019-080602

(51) Int. Cl.
*H02K 5/02* (2006.01)
*H02K 11/40* (2016.01)
(Continued)

(52) U.S. Cl.
CPC ............... *H02K 5/02* (2013.01); *H02K 11/40* (2016.01); *H05K 5/0017* (2013.01); *H02P 6/32* (2016.02)

(58) Field of Classification Search
CPC ........ H02K 5/02; H02K 11/40; H05K 5/0017; H02P 6/32
See application file for complete search history.

(56) References Cited

U.S. PATENT DOCUMENTS 5,640,314 A * 6/1997 Glasband ................ H02M 1/44
363/36
2016/0183389 A1   6/2016 Toyoda et al.

FOREIGN PATENT DOCUMENTS

JP   2001-231268 A   8/2001
JP   2001-245477 A   9/2001
(Continued)

OTHER PUBLICATIONS

Korean Office Action issued May 17, 2023 in corresponding Korean Patent Application No. 10-2021-7032241 (with machine-generated English translation), 8 pages.
(Continued)

*Primary Examiner* — Viet P Nguyen
(74) *Attorney, Agent, or Firm* — XSENSUS LLP

(57) ABSTRACT

An AC electric motor drive system includes a power supply transformer connected to an AC power supply and insulating an AC power supply side and a load side; an AC electric motor; a power converter which converts AC voltage outputted from the power supply transformer to output AC voltage, and which outputs the output AC voltage to the AC electric motor; and a capacitive component having one end connected to the load side of the power supply transformer, and another end grounded.

17 Claims, 13 Drawing Sheets

(51) Int. Cl.
    *H05K 5/00*      (2006.01)
    *H02P 6/32*      (2016.01)

(56)           References Cited

FOREIGN PATENT DOCUMENTS

JP      2001-268890 A     9/2001
JP      2005-130575 A     5/2005
JP      2009-33891 A      2/2009
JP      2015-56970 A      3/2015
JP      2016-119747 A     6/2016

OTHER PUBLICATIONS

International Search Report and Written Opinion mailed on Jun. 2, 2020, received for PCT Application PCT/JP2020/013069, Filed on Mar. 24, 2020, 10 pages including English Translation.
Ogasawara, "Reduction of Leakage Current, Surge Voltage and Shaft Voltage in Variable-Speed AC Drives", T. IEE Japan, vol. 118-D, No. 9, Sep. 1998, pp. 975-980 (8 pages including English Translation).
Office Action issued Jul. 12, 2023 in Chinese Patent Application No. 202080028955.1, 20 pages.
Chinese Office Action dated Jan. 31, 2024, of the corresponding Chinese patent application No. CN202080028955.1, 14 pages.

* cited by examiner

AC ELECTRIC MOTOR DRIVE SYSTEM

CROSS-REFERENCE TO RELATED APPLICATIONS

The present application is based on PCT filing PCT/JP2020/013069, filed Mar. 24, 2020, which claims priority to JP 2019-080602, filed Apr. 22, 2019, the entire contents of each are incorporated herein by reference.

TECHNICAL FIELD

The present disclosure relates to an AC electric motor drive system.

BACKGROUND ART

In a case of performing variable-speed operation of an AC electric motor, in general, input voltage with a commercial frequency is received via a power supply transformer from a three-phase AC power supply such as a power grid, and then is converted by a power converter to arbitrary output voltage with an arbitrary output frequency.

A combination of three-phase output voltages in the output voltage of the power converter does not become zero, but the output voltage includes a common-mode component. The common-mode voltage is applied to a stray capacitance of the AC electric motor, so as to be neutral point voltage, a part of which becomes shaft voltage applied to an insulating lubricant between bearings. If the shaft voltage exceeds dielectric breakdown voltage of the bearings, discharge current with high energy flows through the bearings, so that electrolytic corrosion occurs in the bearings, thus there is a problem of shortening the life.

In order to suppress occurrence of such electrolytic corrosion of the bearings, conventionally, a circuit for reducing common-mode voltage or common-mode current has been proposed, as disclosed in Non-Patent Document 1 below. That is, this conventional technology proposes a method of causing common-mode current to bypass by using passive elements or a method of increasing the impedance of a common-mode path so that an impedance element bears voltage, thereby reducing the neutral point voltage applied to the AC electric motor (hereinafter, these methods are referred to as passive methods), or a method of adding voltage with a phase opposite to the common-mode voltage by using an active element, thereby reducing the neutral point voltage applied to the AC electric motor (hereinafter, this method is referred to as an active method).

CITATION LIST

Non-Patent Document

Non-Patent Document 1: "Suppression Method of Leakage Current, Surge Voltage and Shaft Voltage in Variable-Speed AC Drives", IEEJ transactions D, vol. 118, no. 9, pp. 975-980, September 1998

SUMMARY OF THE INVENTION

Problems to be Solved by the Invention

In the passive methods of the conventional technology disclosed in Non-Patent Document 1, a compensation gain is reduced in a case of compensating low-frequency voltage, due to the impedance frequency characteristics of the passive elements. It is possible to set large C value or large L value of the passive elements in consideration of reduction in the compensation gain, but this causes a problem of increasing the size of the circuit.

On the other hand, the active method has a problem that, due to the influence of the frequency characteristics of the active elements such as an operational amplifier and a power semiconductor element or the frequency characteristics of a control system, phase delay of output voltage occurs in compensation in a high-frequency region, and compensation property is deteriorated by reduction in the compensation gain.

The present disclosure has been made to solve the above problems, and an object of the present disclosure is to provide an AC electric motor drive system that can assuredly prevent occurrence of failures such as electrolytic corrosion of bearings of the AC electric motor without increasing the size of a compensation circuit for reducing common-mode voltage.

Means of Solution to the Problems

An AC electric motor drive system according to the present disclosure includes a power supply transformer connected to an AC power supply and insulating an AC power supply side and a load side; an AC electric motor; a power converter which converts AC voltage outputted from the power supply transformer to output AC voltage, and which outputs the output AC voltage to the AC electric motor; and a capacitive component having one end connected to the load side of the power supply transformer, and another end grounded.

Effect of the Invention

An AC electric motor drive system according to the present disclosure can assuredly prevent occurrence of failures such as electrolytic corrosion of bearings of an AC electric motor without increasing the size of a compensation circuit for reducing common-mode voltage.

EMBODIMENTS FOR CARRYING OUT THE INVENTION

Figure 1:
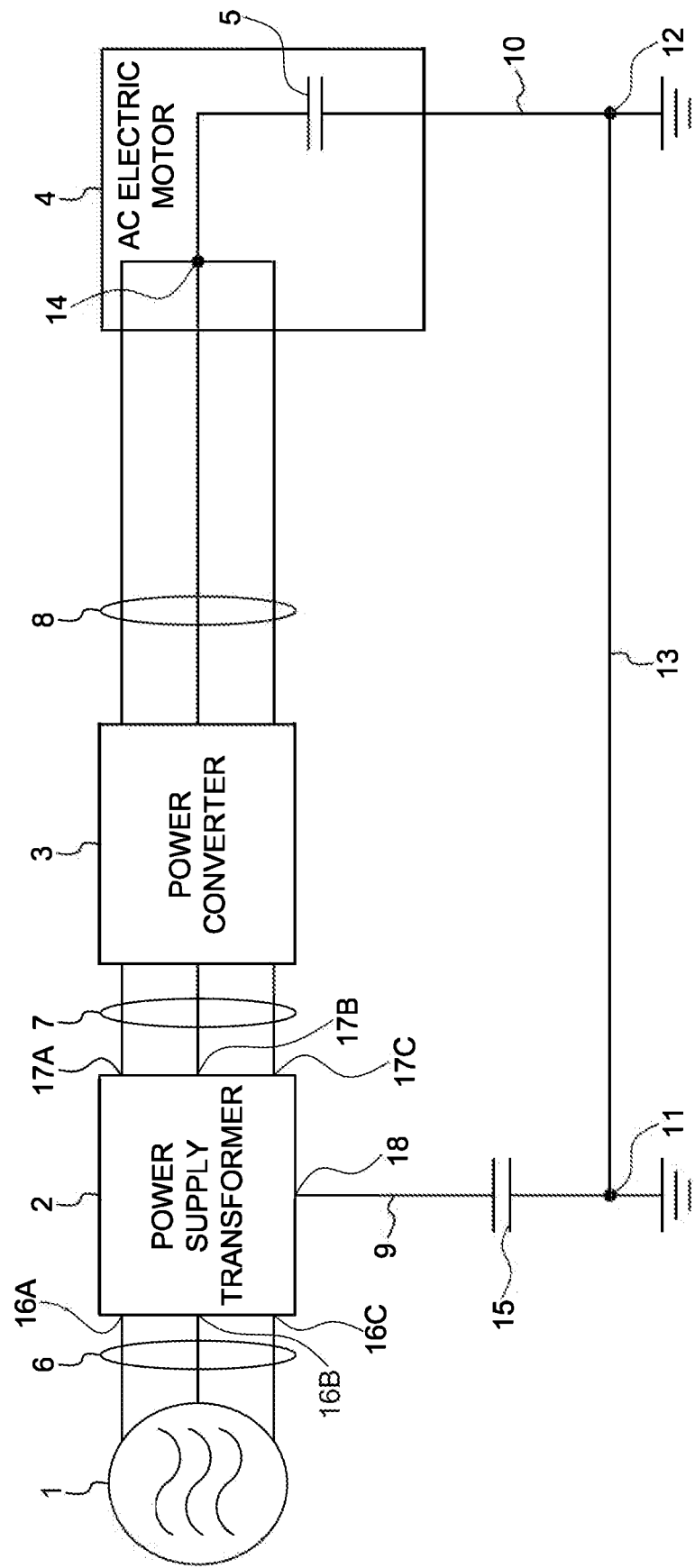
FIG. 1 is a circuit diagram of an AC electric motor drive system with three-phase input according to embodiment 1 of the present disclosure.

Hereinafter, an AC electric motor drive system according to the present embodiment will be described with reference to drawings. In the drawings, the same reference characters denote the same or corresponding parts, and this is applied to all the embodiments described below.

The configurations of components described in the entire specification are merely examples and the components are not limited to the configurations described in the specification. In particular, combination of components is not limited to that in each embodiment, and a component described in any of the embodiments may be applied to other embodiments.

Embodiment 1

FIG. 1 is a circuit diagram of an AC electric motor drive system with three-phase input according to embodiment 1.

The AC electric motor drive system with three-phase input according to embodiment 1 includes an AC power supply 1 such as a power grid or a self-supporting voltage source, a power supply transformer 2, a power converter 3, an AC electric motor 4 which is star-connected, three-phase power lines 6, three-phase power lines 7, three-phase power lines 8, a ground line 9, a ground line 10, and a ground line 13 connecting the ground line 9 and the ground line 10. The power supply transformer 2 ensures electric insulation between the AC power supply 1, and the power converter 3 and a load. The power converter 3 includes a forward conversion circuit composed of semiconductor elements, and a reverse conversion circuit composed of semiconductor elements and power storage elements for storing DC power (all not shown). The three-phase power lines 6 connect the AC power supply 1 and an AC power supply side winding part 16A/16B/16C of the power supply transformer 2. The three-phase power lines 7 connect the load side winding part 17A/17B/17C of the power supply transformer 2 and the power converter 3. The three-phase power lines 8 connect the power converter 3 and the AC electric motor 4. The ground line 9 connects a ground point 11 and an arbitrary point 18 in a load side winding part 17A/17B/17C of the power supply transformer 2. The ground line 10 connects the AC electric motor 4 and a ground point 12.

Here, in the AC electric motor system shown in FIG. 1, a Y connection method is used for the AC electric motor 4, but the AC electric motor system of embodiment 1 is also applicable to a case of a Δ connection method. It is noted that reference character 14 denotes an arbitrary point in a winding part of the AC electric motor 4.

AC power supplied from the AC power supply 1 is received by the power supply transformer 2 for ensuring electric insulation between the AC power supply 1 and the load, and input voltage which is fixed voltage with a fixed frequency is converted by the power converter 3 to variable voltage with a variable frequency, whereby the AC electric motor 4 is driven at a variable speed.

Further, as a feature of embodiment 1, a capacitive component 15 is provided between the load side of the power supply transformer 2 and the ground point 11. The capacitive component 15 in this case is formed by one or a plurality of insulating materials (e.g., a capacitor) or a semiconductor in a nonconductive state (e.g., a diode or a semiconductor switching element in an off state).

Figure 2:
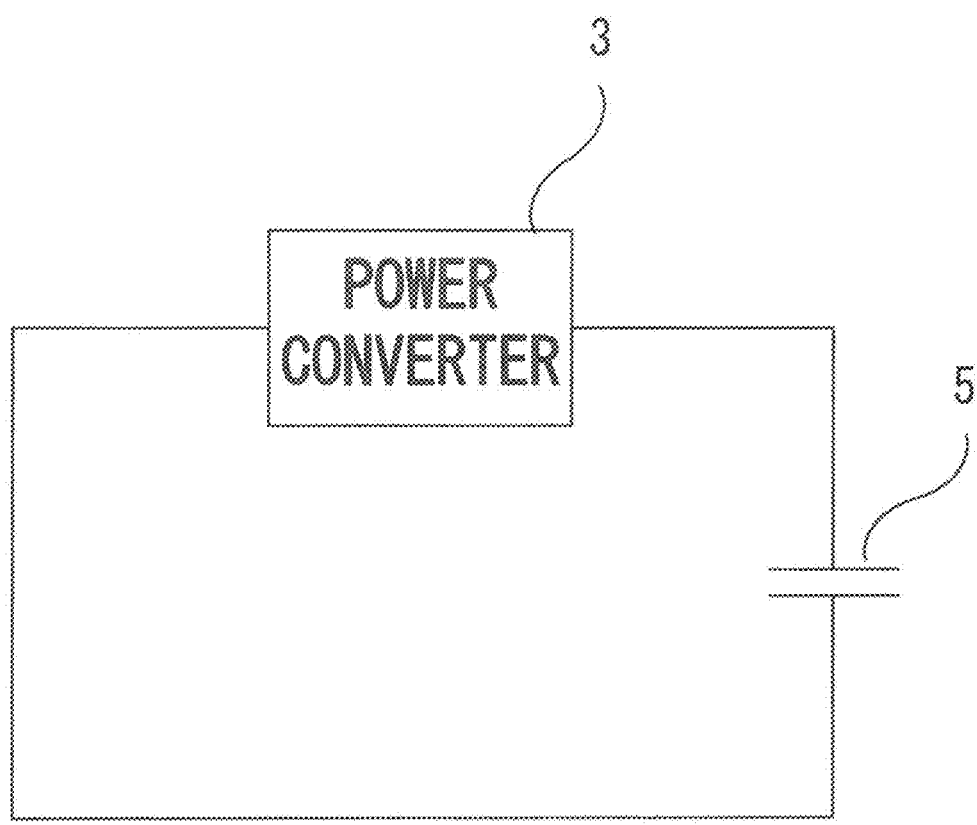
FIG. 2 is an equivalent circuit of a common-mode path in an AC electric motor drive system with three-phase input, as a reference example.

FIG. 2 is an equivalent circuit of a common-mode path in a general AC electric motor drive system as a reference example in a case of not providing the capacitive component 15 which is the feature of embodiment 1. This equivalent circuit has a configuration in which the power converter 3 which is a generation source for common-mode voltage, and a stray capacitance 5 which is necessarily generated in the AC electric motor 4, are connected in series.

Figure 3:
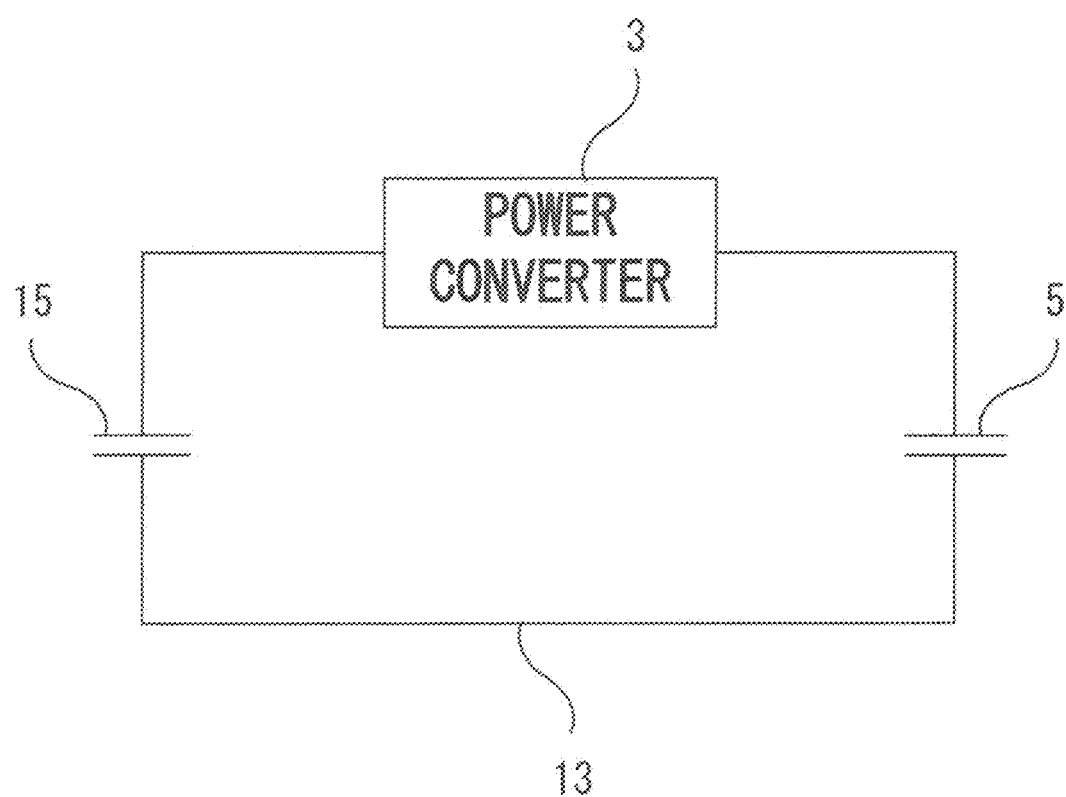
FIG. 3 is an equivalent circuit of a common-mode path in the AC electric motor drive system with three-phase input according to embodiment 1 of the present disclosure.

FIG. 3 is an equivalent circuit of a common-mode path in the AC electric motor drive system in a case of providing the capacitive component 15 which is the feature of embodiment 1. This equivalent circuit has a configuration in which, in addition to the power converter 3 which is a generation source for common-mode voltage and the stray capacitance 5 of the AC electric motor 4, the capacitive component 15 is provided between the power supply transformer 2 and the ground point 11, and the stray capacitance 5 and the capacitive component 15 are connected in series via the ground line 13.

Here, the common-mode voltage which is a combination of three-phase output voltages of the power converter 3 is denoted by Vc, and the neutral point voltage of the AC electric motor 4 applied to the stray capacitance 5 of the AC electric motor 4 is denoted by Vn. In the equivalent circuit of the reference example shown in FIG. 2, the common-mode voltage Vc is all applied to the stray capacitance 5 of the AC electric motor 4. That is, Vn=Vc is satisfied.

On the other hand, in the equivalent circuit of embodiment 1 shown in FIG. 3, the common-mode voltage Vc is divided by the stray capacitance 5 of the AC electric motor 4 and the capacitive component 15. That is, in the case in which the capacitance value of the stray capacitance 5 of the AC electric motor 4 is denoted by C0 and the capacitance value of the capacitive component 15 is denoted by C1, the neutral point voltage Vn applied to the stray capacitance 5 is C1/(C0+C1) multiples of the common-mode voltage Vc on the basis of a voltage division expression. That is, the following expression is satisfied:

$$Vn = Vc \cdot C1/(C0+C1) \qquad (1)$$

As is found from the above Expression (1), the smaller the capacitance value C1 of the capacitive component 15 is, the smaller the neutral point voltage Vn is. In other words, the neutral point voltage Vn is reduced with a small-sized circuit. In addition, the voltage division expression does not depend on frequency, and therefore, unlike other passive methods, the compensation gain is not reduced even in compensation at a low frequency. In addition, since active elements are not used, there is no influence of the frequency characteristics of a control system even for high-frequency components. Therefore, there are no constraints on the compensation effect in reducing the neutral point voltage Vn.

Here, a method for providing the capacitive component 15 will be described.

The capacitive component 15 can be provided by, for example, making the power supply transformer 2 in a non-grounded state. Further it is able to provide a capacitor, one or a plurality of insulating materials, or a semiconductor in a nonconductive state on the ground line 9. The insulating material may be gas, liquid, or solid. It is noted that the ground line 9 may be omitted in practice as long as capacitive property electrically exists between the ground point 11 and an arbitrary point in the winding part on the load side of the power supply transformer 2. It is noted that the above arbitrary point in the winding part on the load side of the power supply transformer 2 is desirably a neutral point in a case of Y connection 20 or desirably a V-phase connection portion in a case of Δ connection 19, but the above arbitrary point is not limited thereto.

As described above, in embodiment 1, the capacitive component 15 is connected in series to the stray capacitance 5 of the AC electric motor 4 in the common-mode path, whereby the common-mode voltage Vc is divided. In this case, the smaller the capacitance value C1 of the capacitive component 15 is set to be, the neutral point voltage Vn applied to the stray capacitance 5 of the AC electric motor 4 can be the smaller. In addition, the voltage allocation ratio between the capacitances is determined only by the capacitance ratio, and thus the voltage allocation ratio does not depend on frequency. Therefore, it is possible to prevent occurrence of failures such as electrolytic corrosion of bearings of the AC electric motor 4 merely by adding a small-sized circuit.

The configuration of embodiment 1 is not limited to the above one, and as the basic principle of the present disclosure, the capacitive component 15 is connected in series on the common-mode path. As a method therefor, the capacitive component 15 is added between the winding on the load side of the power supply transformer 2 and the ground point 11. Therefore, the connection method of the three-phase power supply transformer 2 is not limited, and Δ-Y connection, Y-Δ connection, Δ-Δ connection, Y-Y connection, or multiply connection may be adopted.

Embodiment 2

Figure 4:
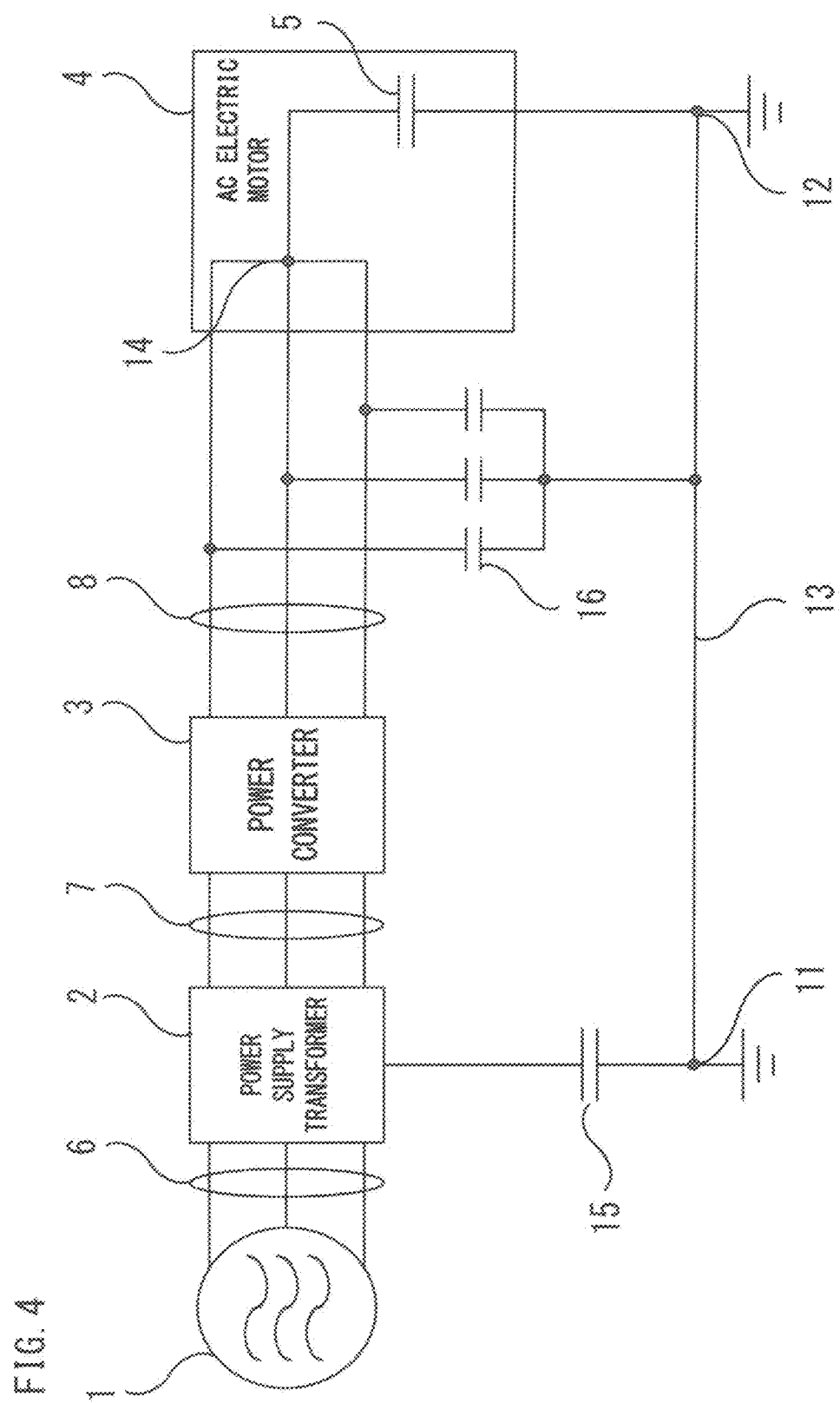
FIG. 4 is a circuit diagram of an AC electric motor drive system according to embodiment 2 of the present disclosure.

FIG. 4 is a circuit diagram of an AC electric motor drive system according to embodiment 2 of the present disclosure.

In embodiment 2, in addition to the configuration in which the capacitive component 15 is provided between the power supply transformer 2 and the ground point 11 as described in embodiment 1, capacitors 16 connected in Y form are provided as capacitive components connecting the ground line 13 and the three-phase power lines 8 connecting the power converter 3 and the AC electric motor 4.

Figure 5:
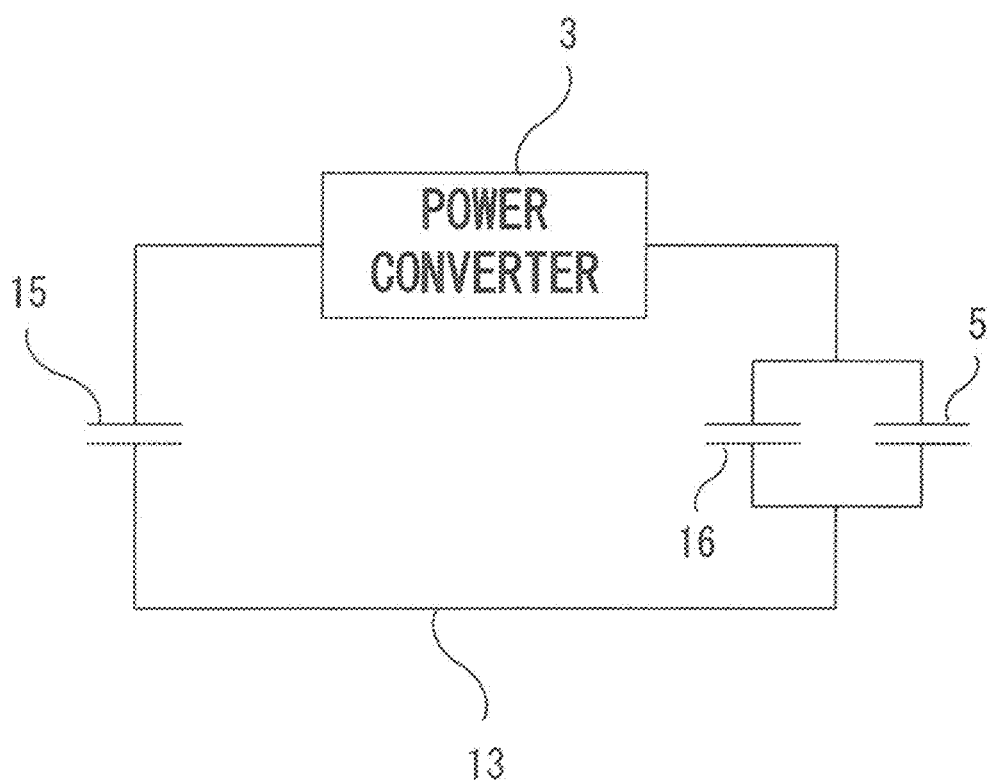
FIG. 5 is an equivalent circuit of a common-mode path in the AC electric motor drive system according to embodiment 2 of the present disclosure.

FIG. 5 is an equivalent circuit of a common-mode path in embodiment 2. Specifically, the power converter 3, a circuit in which the stray capacitance 5 of the AC electric motor 4 and the capacitors 16 are connected in parallel to each other, and the capacitive component 15 are sequentially connected in series.

On the common-mode path, the stray capacitance 5 of the AC electric motor 4 and the capacitors 16 are connected in parallel to each other, so that the combined capacitance increases. That is, in the case in which the capacitance value of the capacitors 16 is denoted by C2, the capacitance value of the combination of the stray capacitance 5 and the capacitors 16 is C0+C2. Therefore, the neutral point voltage Vn of the AC electric motor 4 applied to the stray capacitance 5 of the AC electric motor 4 is C1/(C0+C1+C2) multiples of the common-mode voltage Vc on the basis of a voltage division expression. That is, the following expression is satisfied:

$$Vn = Vc \cdot C1/(C0+C1+C2) \qquad (2)$$

As is found from comparison between the above Expression (1) and Expression (2), embodiment 2 serves to improve the effect of reduction of the neutral point voltage Vn, in comparison with embodiment 1. In addition, as described in embodiment 1, if the capacitance value C1 of the capacitive component 15 is set to be small, the ratio of C1 and C0+C2 can be easily improved by the capacitor 16 having a small size, whereby size increase in the circuit can be prevented. When the capacitor 16 is provided, the impedance of the common-mode path is reduced and thus leakage current increases. However, if the capacitance value C1 of the capacitive component 15 is set to be small, the amount of increase in the leakage current is restricted.

As described above, in embodiment 2, the capacitors 16 connecting the three-phase power lines 8 and the ground line 13 are connected in parallel to the stray capacitance 5 of the AC electric motor 4, whereby the capacitance voltage-division ratio is adjusted, and thus the neutral point voltage Vn applied to the stray capacitance 5 can be reduced.

It is noted that the capacitors 16 shown in embodiment 2 are not limited to the capacitors 16 connected in Y form as shown in FIG. 4, and any configuration having capacitive components in the circuit connecting the three-phase power lines 8 and the ground line 13 may be adopted. For example, a configuration for connecting current limiting resistors in series, or a circuit in which a capacitor is further connected to a neutral point of the capacitors 16 connected in Y form, may be used. Whereby the voltage division ratio can be adjusted in the same manner.

Embodiment 3

Figure 6:
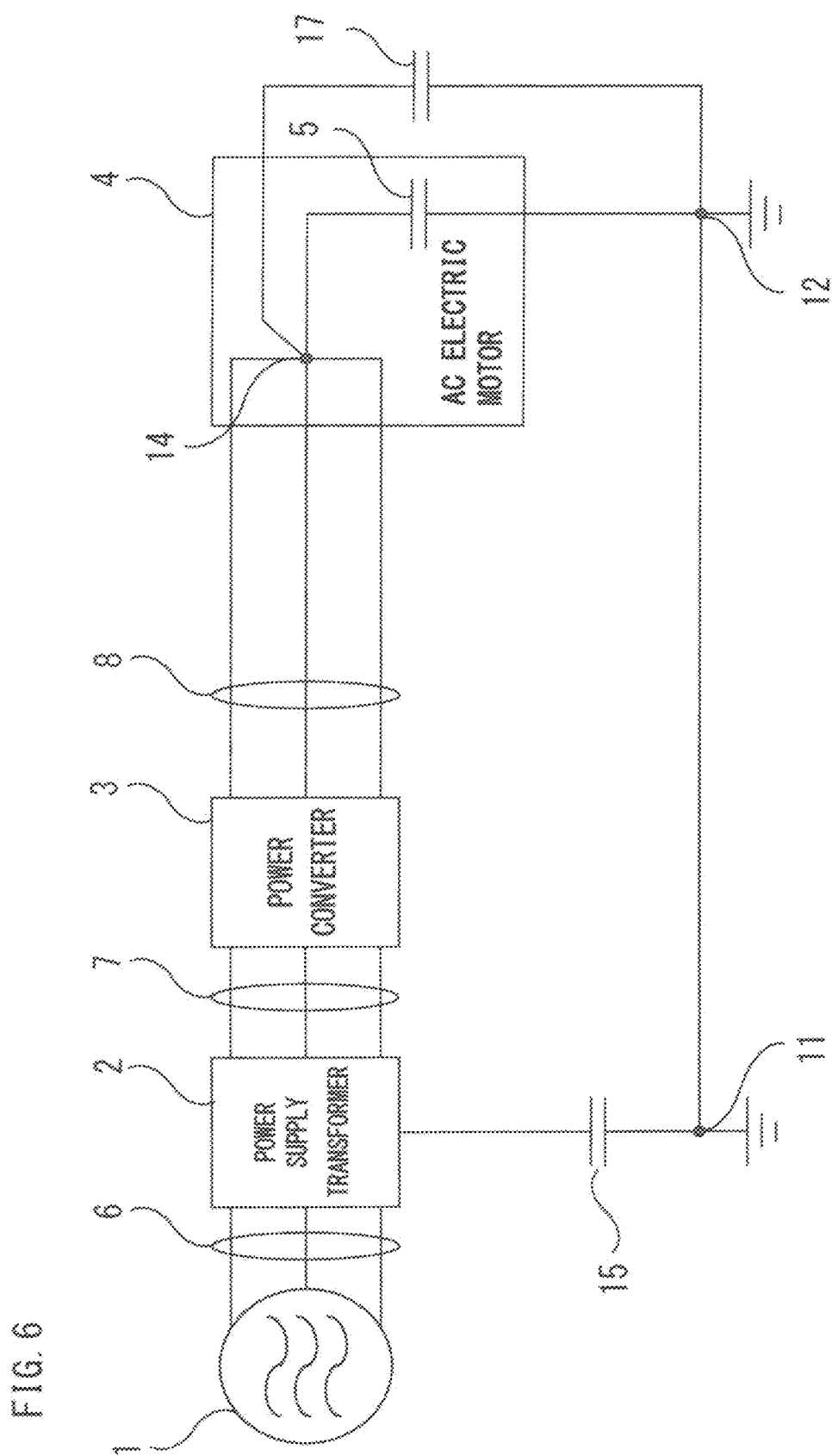
FIG. 6 is a circuit diagram of an AC electric motor drive system according to embodiment 3 of the present disclosure.

FIG. 6 is a circuit diagram of an AC electric motor drive system according to embodiment 3 of the present disclosure.

In embodiment 3, in addition to the configuration in which the capacitive component 15 is provided between the power supply transformer 2 and the ground point 11 as described in embodiment 1, a winding part grounding capacitor 17 is provided as a capacitive component connected in parallel to the stray capacitance 5 of the AC electric motor 4, between the arbitrary point 14 in the winding part of the AC electric motor 4 and the ground point 12 on the AC electric motor side.

Figure 7:
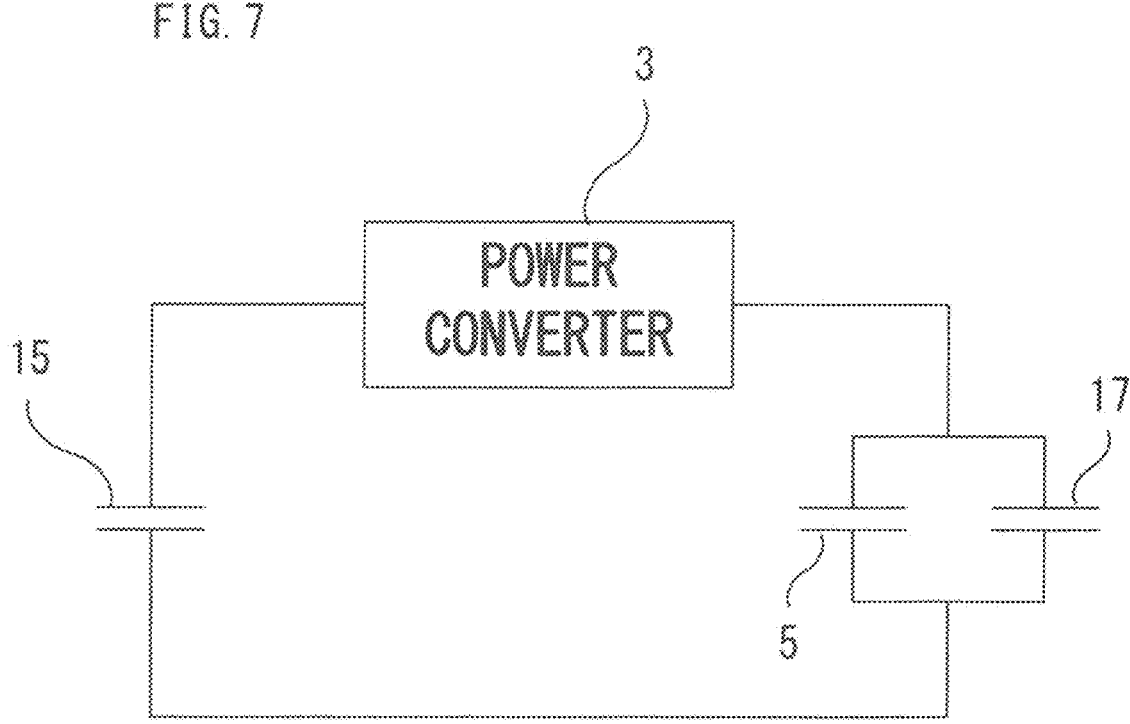
FIG. 7 is an equivalent circuit of a common-mode path in the AC electric motor drive system according to embodiment 3 of the present disclosure.

FIG. 7 is an equivalent circuit of a common-mode path in embodiment 3. Specifically, the power converter 3, a circuit in which the stray capacitance 5 of the AC electric motor 4 and the winding part grounding capacitor 17 are connected in parallel, and the capacitive component 15 are sequentially connected in series.

Here, the capacitance value of the winding part grounding capacitor 17 is denoted by C3. On the common-mode path, the stray capacitance 5 and the winding part grounding capacitor 17 are connected in parallel, and thus the capacitance value of the combination of the stray capacitance 5 and the winding part grounding capacitor 17 is C0+C3. Therefore, the neutral point voltage Vn of the AC electric motor 4 applied to the stray capacitance 5 is C1/(C0+C1+C3) multiples of the common-mode voltage Vc on the basis of a voltage division expression. That is, the following expression is satisfied:

$$Vn = Vc \cdot C1/(C0+C1+C3) \qquad (3)$$

As is found from comparison between the above Expression (1) and Expression (3), embodiment 3 serves to improve the effect of reduction of the neutral point voltage Vn, in comparison with embodiment 1. In addition, if the capacitance value C1 of the capacitive component 15 is set to be small, the ratio of C1 and C0+C3 in the voltage division expression can be easily improved by the winding part grounding capacitor 17 having a small size. When the winding part grounding capacitor 17 is connected, the impedance of the common-mode path is reduced, so that leakage current increases. However, since the capacitive component 15 is set at a small value, the amount of increase in the leakage current is restricted.

As described above, in embodiment 3, the winding part grounding capacitor 17 is connected in parallel to the stray capacitance 5 of the AC electric motor 4, whereby the neutral point voltage Vn applied to the stray capacitance 5 of the AC electric motor 4 can be reduced.

Embodiment 4

Figure 8:
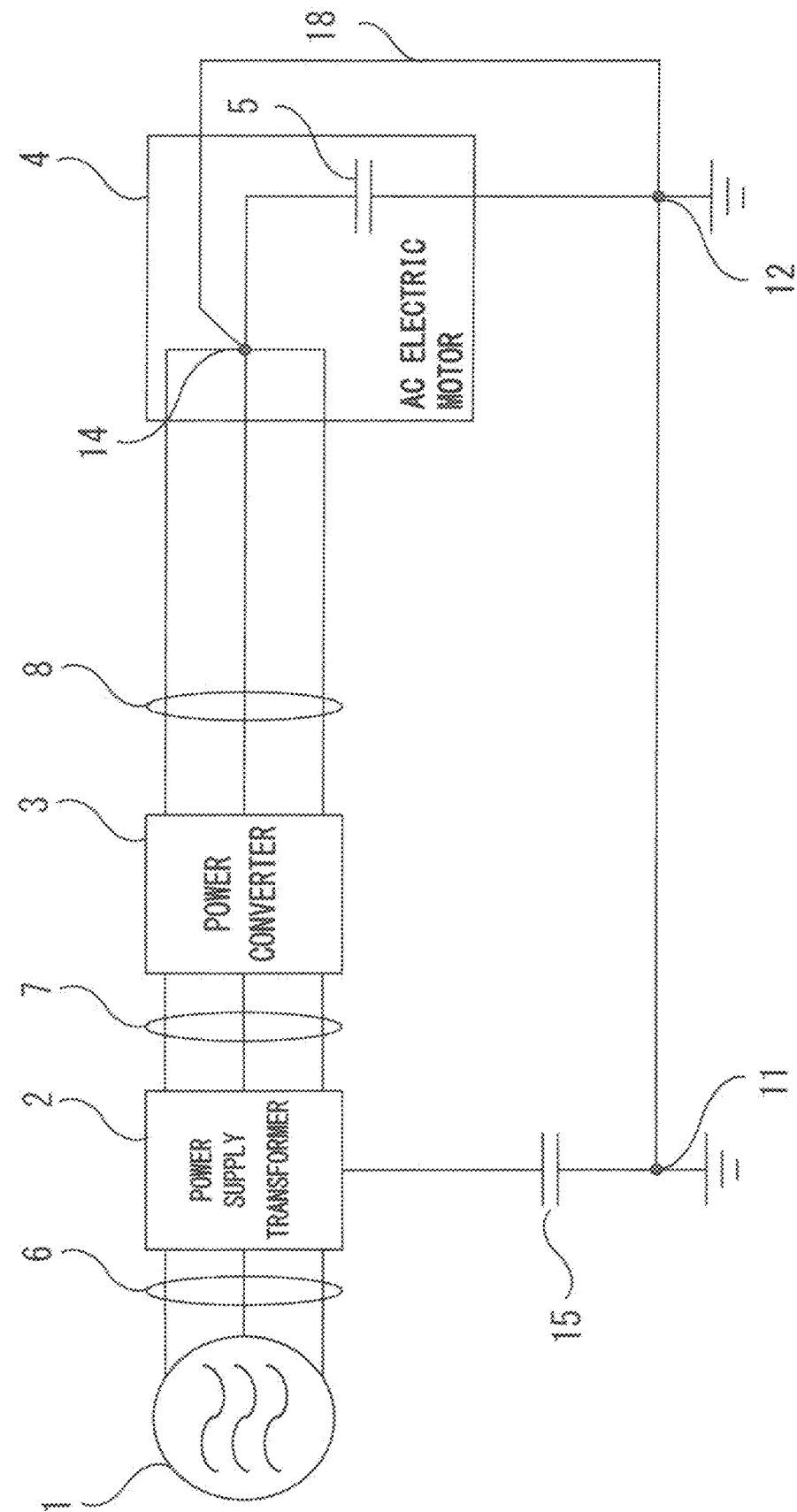
FIG. 8 is a circuit diagram of an AC electric motor drive system according to embodiment 4 of the present disclosure.

FIG. 8 is a circuit diagram of an AC electric motor drive system according to embodiment 4 of the present disclosure.

In embodiment 4, in addition to the configuration in which the capacitive component 15 is provided between the power supply transformer 2 and the ground point 11 as described in embodiment 1, a low-impedance element 18 connected in parallel to the stray capacitance 5 of the AC electric motor 4 is provided between the arbitrary point 14 in the winding part of the AC electric motor 4 and the ground point 12 on the AC electric motor side. The low-impedance element 18 in this case may be any element having a smaller impedance than the stray capacitance 5, and for example, a conductive wire may be used.

Figure 9:
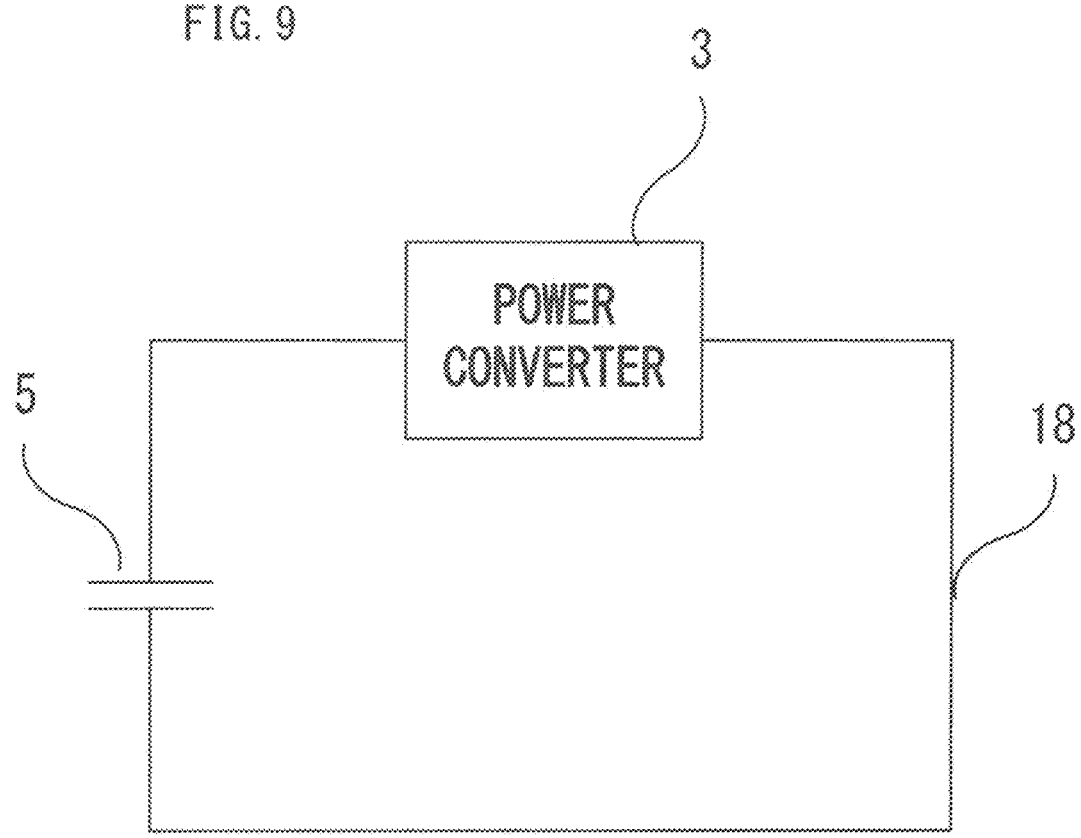
FIG. 9 is an equivalent circuit of a common-mode path in the AC electric motor drive system according to embodiment 4 of the present disclosure.

FIG. 9 is an equivalent circuit of a common-mode path in embodiment 4. Specifically, the power converter 3 and the capacitive component 15 are sequentially connected in series. Thus, in principle, the neutral point voltage Vn applied to the stray capacitance 5 of the AC electric motor 4 becomes zero.

When the low-impedance element 18 is connected, the impedance of the common-mode path is reduced, so that leakage current increases. However, since the capacitance value C1 of the capacitive component 15 is set to be small, the amount of increase in the leakage current is restricted.

As described above, in embodiment 4, the low-impedance element 18 is connected in parallel to the stray capacitance 5 of the AC electric motor 4, whereby the neutral point voltage Vn applied to the stray capacitance 5 can be reduced.

Embodiment 5

Figure 10:
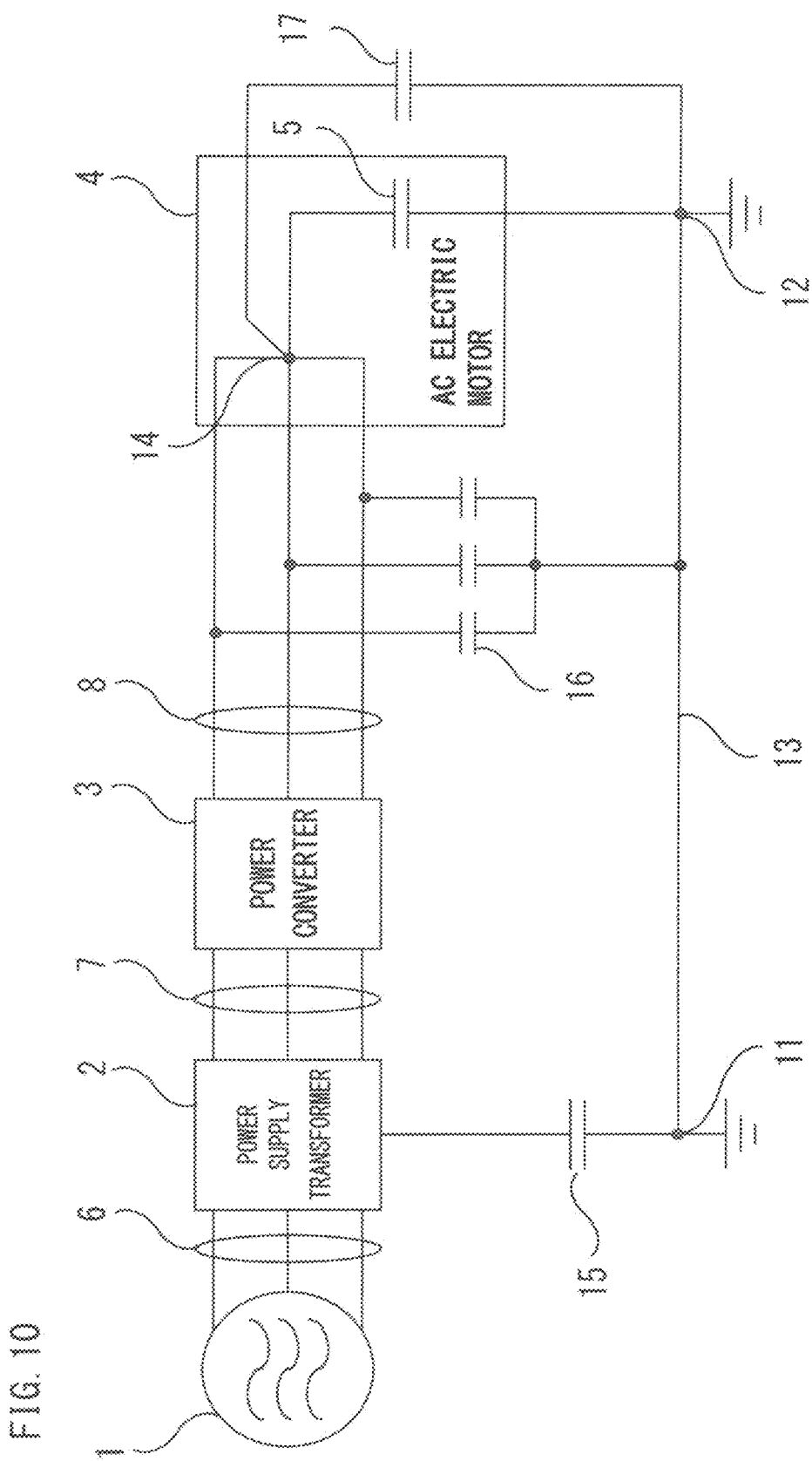
FIG. 10 is a circuit diagram of an AC electric motor drive system according to embodiment 5 of the present disclosure.

FIG. 10 is a circuit diagram of an AC electric motor drive system according to embodiment 5 of the present disclosure.

In embodiment 5, the AC electric motor drive system with three-phase input is configured by using combination of the configurations in the above embodiments 1 to 3. That is, in embodiment 5, the capacitive component 15 is provided between the load side of the power supply transformer 2 and the ground point 11. In addition, the three-phase power lines 8 connecting the power converter 3 and the AC electric motor 4, and the ground line 13, are connected via the capacitors 16 connected in Y-form. Further, the winding part grounding capacitor 17 is connected in parallel to the stray capacitance 5 of the AC electric motor 4, between the arbitrary point 14 in the winding part of the AC electric motor 4 and the ground point 12 on the AC electric motor side.

Figure 11:
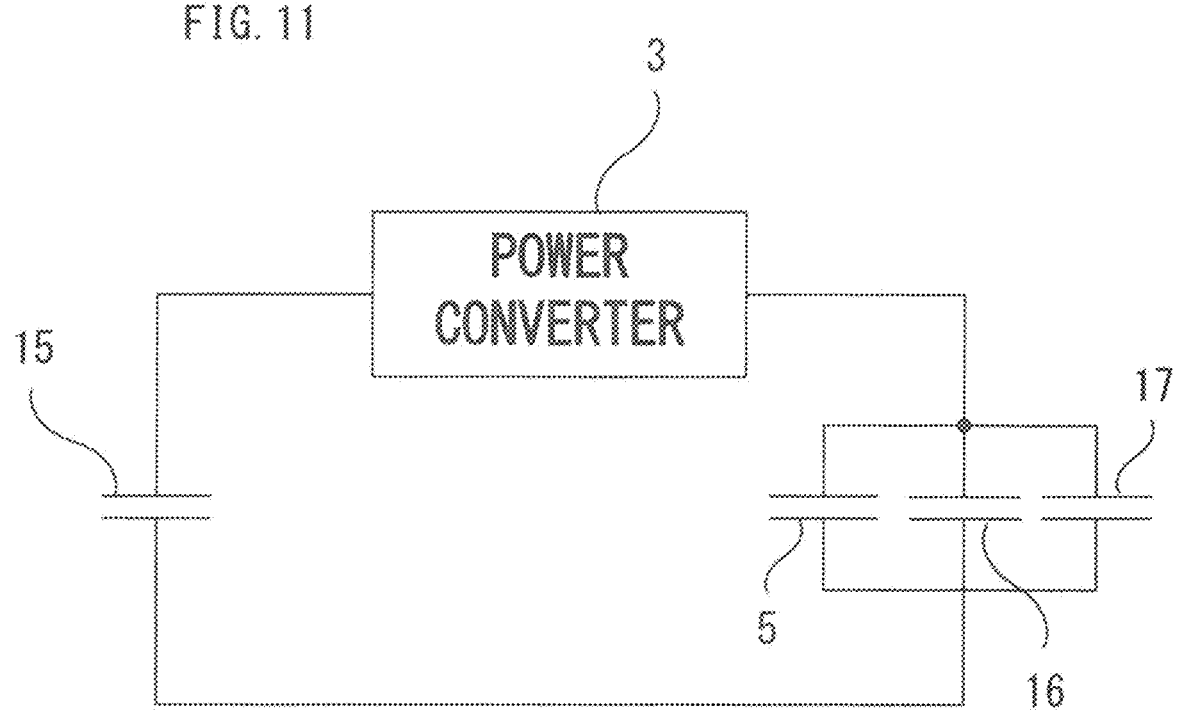
FIG. 11 is an equivalent circuit of a common-mode path in the AC electric motor drive system according to embodiment 5 of the present disclosure.
Figure 12:
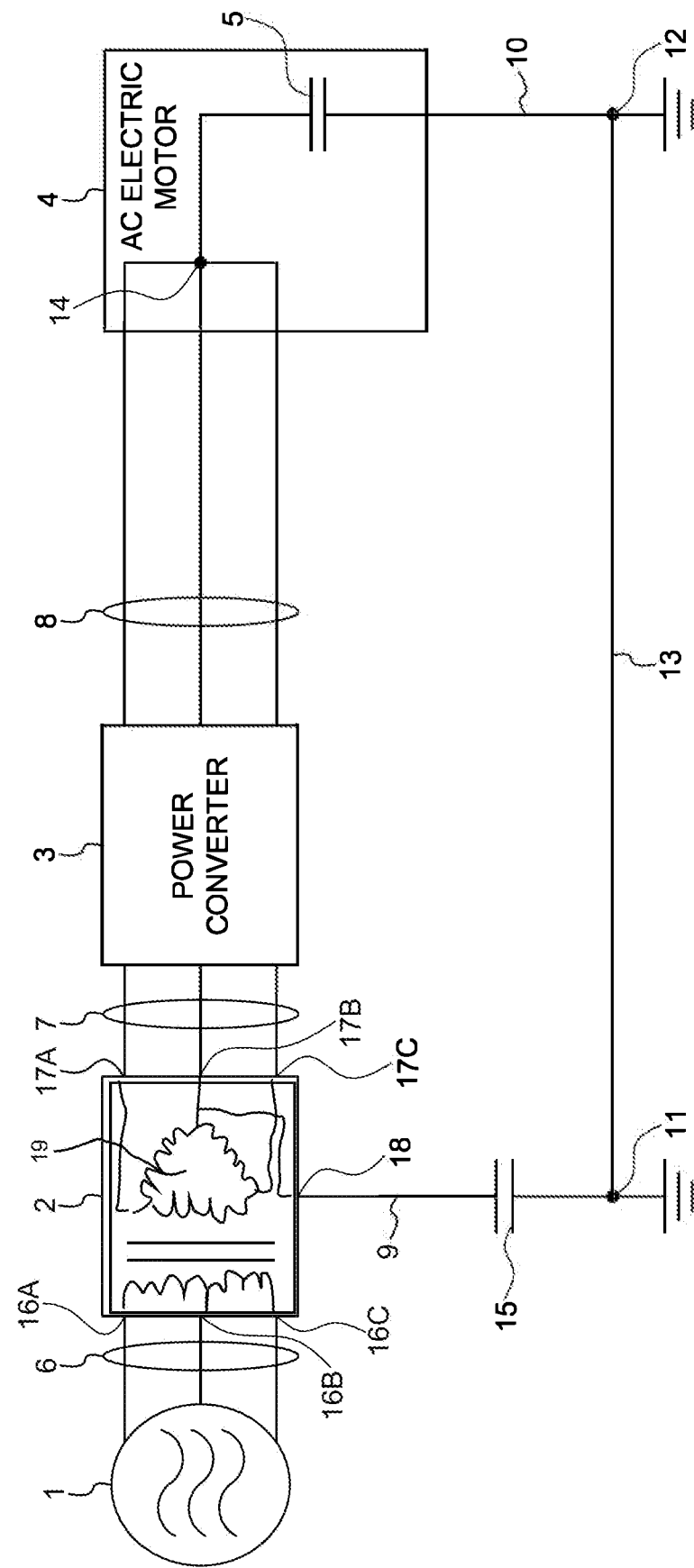
FIG. 12 is a circuit diagram of an AC electric motor drive system with three-phase input and Δ-connected load side windings according to an embodiment of the present disclosure.
Figure 13:
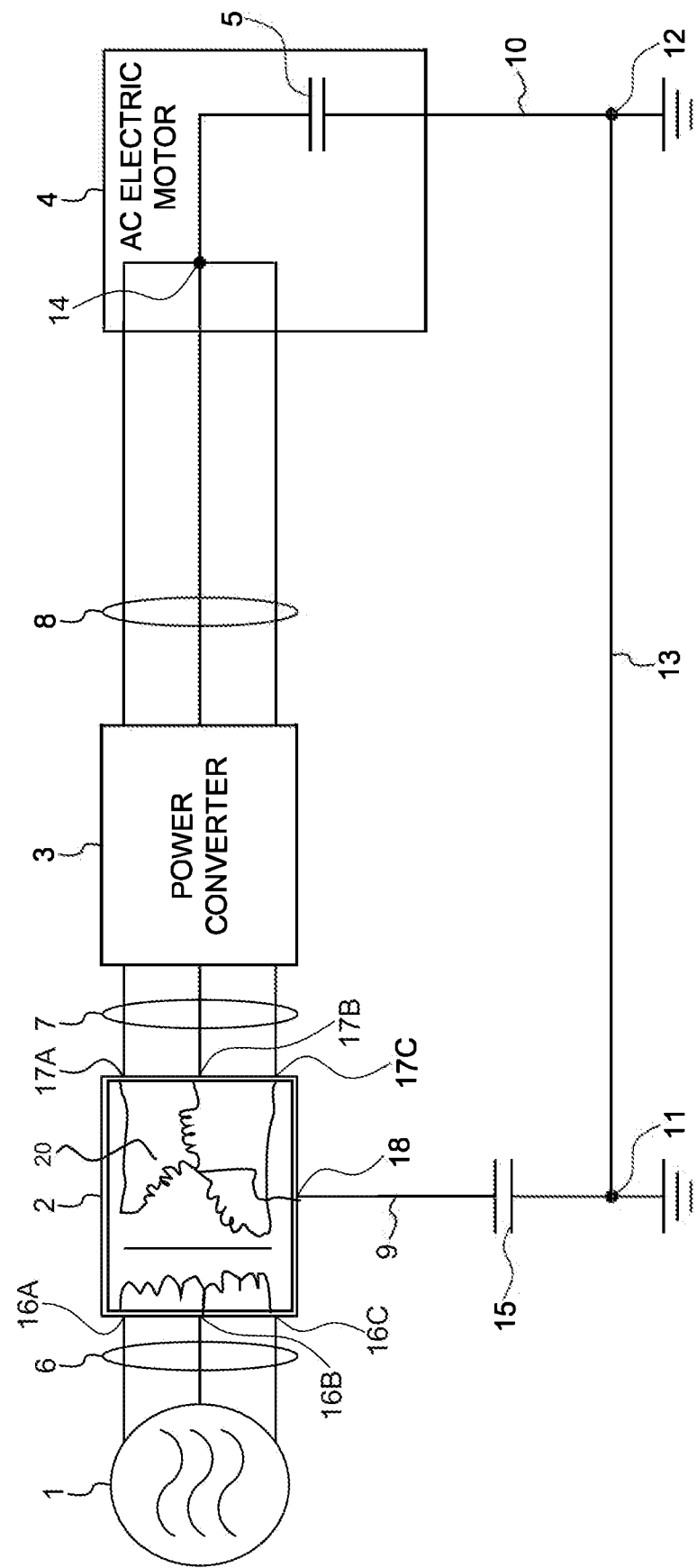
FIG. 13 is a circuit diagram of an AC electric motor drive system with three-phase input and Y-connected load side windings according to an embodiment of the present disclosure.

FIG. 11 is an equivalent circuit of a common-mode path in embodiment 5. Specifically, the power converter 3, a circuit in which the stray capacitance 5 of the AC electric motor 4, the capacitors 16, and the winding part grounding capacitor 17 are connected in parallel to each other, and the capacitive component 15 are sequentially connected in series.

On the common-mode path, the stray capacitance 5, the capacitors 16, and the winding part grounding capacitor 17 are connected in parallel to each other, and thus the combined capacitance value is C0+C1+C2+C3. Therefore, the neutral point voltage Vn of the AC electric motor 4 applied to the stray capacitance 5 is C1/(C0+C1+C2+C3) multiples of the common-mode voltage Vc on the basis of a voltage division expression. That is, the following expression is satisfied:

$$Vn=Vc \cdot C1/(C0+C1+C2+C3) \tag{4}$$

As is found from comparison among the above Expressions (1) to (4), the combined capacitance in embodiment 5 is larger than those in embodiments 1, 2, 3. Thus the effect of reducing the neutral point voltage Vn can be improved more and more.

As described above, in embodiment 5, the configurations of the above embodiments 1 to 3 are combined, whereby the neutral point voltage Vn applied to the stray capacitance 5 of the AC electric motor 4 can be reduced more and more.

In the above embodiments 1 to 5, the power converter 3 is not limited to the configuration described above, and may be a cycloconverter or a matrix converter which performs AC-AC direct conversion without having a power storage element in principle.

The AC electric motor 4 is an induction motor or a synchronous motor, and the connection method thereof is not limited to Y-connection and may be Δ-connection. In the AC electric motor drive system, an operational amplifier for reducing conduction noise or radiation noise, or a noise filter of an active type or a passive type having semiconductor elements, may be connected to the three-phase power lines 6, 7, 8.

The configuration in the present disclosure is not limited to the AC electric motor drive system having three-phase input as shown in FIG. 1, and is also applicable to an AC electric motor drive system having single-phase input. Accordingly, a single-phase AC power supply 1, a single-phase power supply transformer 2, and single-phase power lines 6, 7 may be used.

Although the disclosure is described above in terms of various exemplary embodiments and implementations, it should be understood that the various features, aspects, and functionality described in one or more of the individual embodiments are not limited in their applicability to the particular embodiment with which they are described, but they can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 AC power supply
2 power supply transformer
3 power converter
4 AC electric motor
5 stray capacitance
6, 7, 8 three-phase power line
9, 10 ground line
11, 12 ground point
13 ground line
14 arbitrary point in winding part
15 capacitive component
16 capacitor
17 winding part grounding capacitor
18 low-impedance element

The invention claimed is:

1. An AC electric motor drive system comprising:
a power supply transformer connected to an AC power supply, the power supply transformer including at least one AC power supply side winding and at least one load side winding that is electrically insulated from the at least one AC power supply side winding;
an AC electric motor;
a power converter for converting AC voltage outputted from the at least one load side winding of the power supply transformer to output AC voltage, and for outputting the output AC voltage to the AC electric motor; and
a first capacitive component having one end electrically connected to a connection point on the at least one load side winding of the power supply transformer, and another end grounded,
the first capacitive component is formed by a material including an insulator, or a semiconductor in a non-conductive state.

2. The AC electric motor drive system according to claim 1, wherein
the capacitance value of the first capacitive component is set so that the neutral point voltage applied to a stray capacitance of the AC electric motor becomes small.

3. The AC electric motor drive system according to claim 2, wherein
the capacitance value of the first capacitive component is smaller than the capacitance value of the stray capacitance of the AC electric motor.

4. The AC electric motor drive system according to claim 3, further comprising the second capacitive component having one end connected to the power line connecting the power converter and the AC electric motor, and another end grounded.

5. The AC electric motor drive system according to claim 4, further comprising the third capacitive component having one end connected to the winding part of the AC electric motor, and another end grounded.

6. The AC electric motor drive system according to claim 3, further comprising the third capacitive component having one end connected to the winding part of the AC electric motor, and another end grounded.

7. The AC electric motor drive system according to claim 3, further comprising the low-impedance element having one end connected to the winding part of the AC electric motor, and another end grounded.

8. The AC electric motor drive system according to claim 2, further comprising the second capacitive component having one end connected to the power line connecting the power converter and the AC electric motor, and another end grounded.

9. The AC electric motor drive system according to claim 8, further comprising the third capacitive component having one end connected to the winding part of the AC electric motor, and another end grounded.

10. The AC electric motor drive system according to claim 2, further comprising the third capacitive component having one end connected to the winding part of the AC electric motor, and another end grounded.

11. The AC electric motor drive system according to claim 2, further comprising the low-impedance element having one end connected to the winding part of the AC electric motor, and another end grounded.

12. The AC electric motor drive system according to claim 1, further comprising a second capacitive component having one end connected to a power line connecting the power converter and the AC electric motor, and another end grounded.

13. The AC electric motor drive system according to claim 12, further comprising the third capacitive component having one end connected to the winding part of the AC electric motor, and another end grounded.

14. The AC electric motor drive system according to claim 1, further comprising a third capacitive component having one end connected to a winding part of the AC electric motor, and another end grounded.

15. The AC electric motor drive system according to claim 1, further comprising a low-impedance element having one end connected to the winding part of the AC electric motor, and another end grounded.

16. The AC electric motor drive system according to claim 1, wherein:
the at least one load side winding includes Y-connected windings having a neutral point; and
the connection point is the neutral point on the load side winding of the power supply transformer.

17. The AC electric motor drive system according to claim 1, wherein:
the at least one load side winding includes A-connected windings having U, V, and W-phase connection portions; and
the connection point is the V-phase connection portion on the load side winding of the power supply transformer.

* * * * *